United States Patent
Neff et al.

(10) Patent No.: US 9,010,373 B2
(45) Date of Patent: Apr. 21, 2015

(54) PRESSURE BALANCED VALVE WITH DIAPHRAGM VALVE MEMBER END SEAL

(75) Inventors: Robert H. Neff, Bloomfield Village, MI (US); Jeffrey Simmonds, Commerce Township, MI (US)

(73) Assignee: MAC Valves, Inc., Wixom, MI (US)

( * ) Notice: Subject to any disclaimer, the term of this patent is extended or adjusted under 35 U.S.C. 154(b) by 859 days.

(21) Appl. No.: 13/226,161

(22) Filed: Sep. 6, 2011

(65) Prior Publication Data

US 2012/0061600 A1    Mar. 15, 2012

Related U.S. Application Data

(60) Provisional application No. 61/381,320, filed on Sep. 9, 2010.

(51) Int. Cl.
| | |
|---|---|
| *F16K 7/00* | (2006.01) |
| *F16K 31/06* | (2006.01) |
| *F16K 11/044* | (2006.01) |
| *F16K 39/02* | (2006.01) |
| *F15B 13/044* | (2006.01) |
| *F16K 41/12* | (2006.01) |

(52) U.S. Cl.
CPC ........... *F16K 31/0627* (2013.01); *F16K 11/044* (2013.01); *F16K 39/022* (2013.01); *F15B 13/044* (2013.01); *F16K 41/12* (2013.01)

(58) Field of Classification Search
CPC . F16K 11/044; F16K 31/0627; F16K 39/022; F16K 41/12; F15B 13/044
USPC ............ 137/625.25, 625.65; 251/129.07, 282
See application file for complete search history.

(56) References Cited

U.S. PATENT DOCUMENTS

| | | | | |
|---|---|---|---|---|
| 1,385,681 | A | * | 7/1921 | Hammond ................. 251/335.2 |
| 3,003,743 | A | * | 10/1961 | Sattler .......................... 251/282 |
| 3,570,806 | A | * | 3/1971 | Sturman et al. ............... 251/282 |

(Continued)

FOREIGN PATENT DOCUMENTS

JP    2010-523915 A    7/2010

OTHER PUBLICATIONS

International Search Report for PCT/US2011/050615 mailed Apr. 12, 2012.

(Continued)

*Primary Examiner* — John K Fristoe, Jr.
*Assistant Examiner* — Christopher Ballman
(74) *Attorney, Agent, or Firm* — Harness, Dickey & Pierce, P.L.C.

(57) ABSTRACT

A diaphragm sealed, pressure balanced valve assembly includes a valve body and a cartridge connected to the valve body. The cartridge includes a cartridge loading end having a retaining member engaged to the cartridge loading end. A valve member slides coaxial to a longitudinal axis of the valve body. A resilient material first diaphragm is connected to and extends diametrically outward from the valve member having a diaphragm body clasped between the retaining member and the cartridge loading end, creating a first diaphragm fluid pressure boundary. A resilient material second diaphragm is connected to and extends diametrically outward from the valve member at an opposite end of the valve member with respect to the first diaphragm and has a diaphragm body clasped between first and second adjustable retention members, creating a second diaphragm fluid pressure boundary.

33 Claims, 11 Drawing Sheets

(56) References Cited

U.S. PATENT DOCUMENTS

| | | | | |
|---|---|---|---|---|
| 3,613,733 | A | * | 10/1971 | Machek .................. 137/625.65 |
| 3,670,962 | A | * | 6/1972 | Johnston ..................... 251/282 |
| 3,753,526 | A | * | 8/1973 | Johnson ....................... 251/282 |
| 3,985,333 | A | | 10/1976 | Paulsen |
| 4,013,091 | A | | 3/1977 | Hudson |
| 4,140,089 | A | | 2/1979 | Kueny et al. |
| 4,204,554 | A | | 5/1980 | Taig |
| 4,421,083 | A | | 12/1983 | Stoltman |
| 4,598,736 | A | | 7/1986 | Chorkey |
| 5,007,458 | A | | 4/1991 | Marcus et al. |
| 5,234,265 | A | | 8/1993 | Tyler |
| 5,931,188 | A | | 8/1999 | Sprague |
| 6,000,416 | A | | 12/1999 | Kingsford et al. |
| 6,035,895 | A | * | 3/2000 | Grill et al. ................ 137/625.65 |
| 6,116,276 | A | * | 9/2000 | Grill ....................... 137/625.65 |
| 6,318,406 | B1 | | 11/2001 | Conley |
| 6,349,858 | B1 | | 2/2002 | Kingsford et al. |
| 6,481,689 | B2 | | 11/2002 | Grill |
| 6,488,050 | B1 | * | 12/2002 | Jabcon .................... 137/625.65 |
| 6,652,492 | B1 | | 11/2003 | Bell et al. |
| 6,719,268 | B2 | | 4/2004 | Fukano et al. |
| 6,808,520 | B1 | | 10/2004 | Fourkas et al. |
| 7,363,934 | B1 | | 4/2008 | Lin |
| 8,151,824 | B2 | | 4/2012 | Williams et al. |
| 2001/0009161 | A1 | | 7/2001 | Berger |
| 2004/0025948 | A1 | | 2/2004 | Herbert |
| 2005/0056318 | A1 | | 3/2005 | Arlinghaus, Jr. |
| 2006/0213367 | A1 | * | 9/2006 | Sacristan et al. .................. 92/99 |
| 2007/0060826 | A1 | | 3/2007 | Krauter |
| 2008/0149877 | A1 | | 6/2008 | Bessman |
| 2008/0191158 | A1 | * | 8/2008 | Okitsu ......................... 251/214 |
| 2008/0245427 | A1 | * | 10/2008 | Williams et al. ......... 137/625.25 |

OTHER PUBLICATIONS

Written Opinion of the International Searching authority for PCT/US2011/050615 mailed Apr. 12, 2012.

English translation of Japanese Office Action mailed Aug. 19, 2014 for Serial No. JP 2013-528257.

* cited by examiner

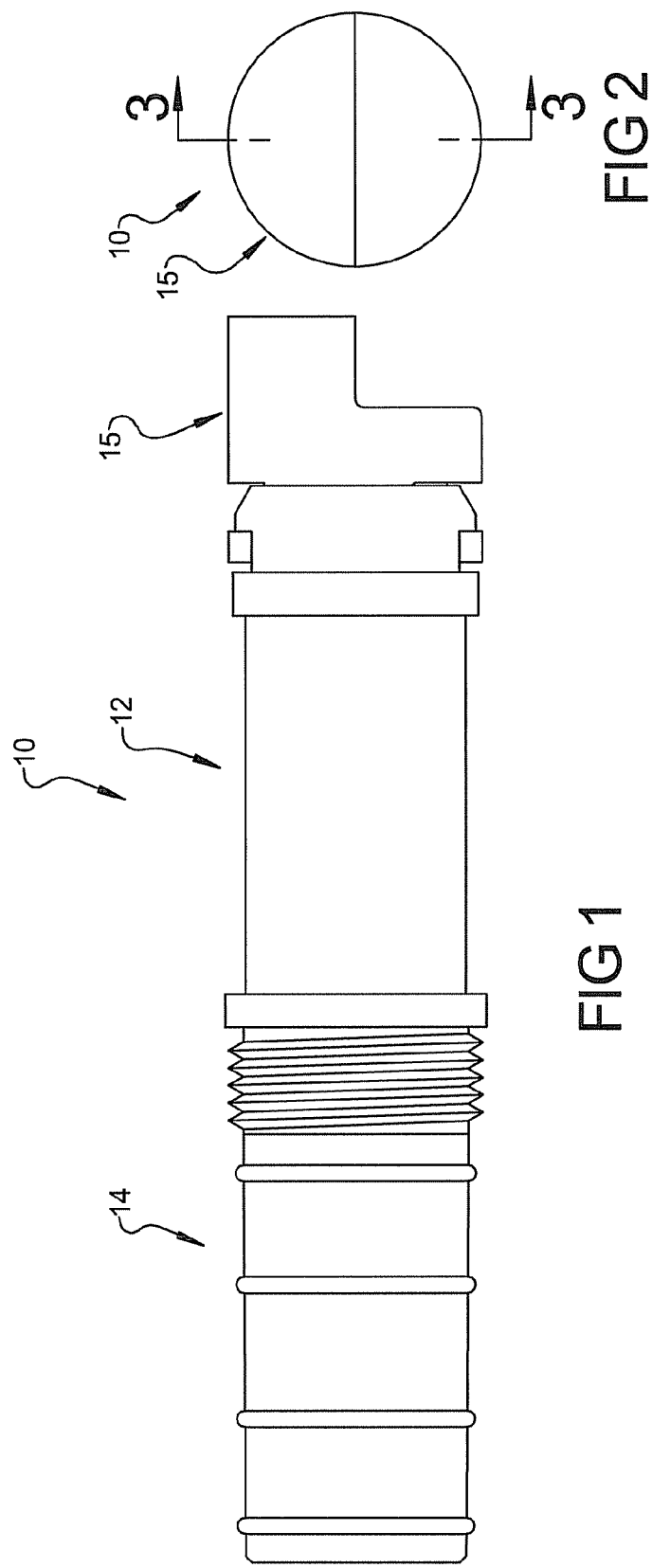

PRESSURE BALANCED VALVE WITH DIAPHRAGM VALVE MEMBER END SEAL

CROSS-REFERENCE TO RELATED APPLICATIONS

This application claims the benefit of U.S. Provisional Application No. 61/381,320, filed on Sep. 9, 2010. The entire disclosure of the above application is incorporated herein by reference.

FIELD

The present disclosure relates to valves having a pressure balanced valve member and a valve member diaphragm seal.

BACKGROUND

This section provides background information related to the present disclosure which is not necessarily prior art.

Solenoid operated valves are known which provide control of a fluid such as pressurized air for use in operating equipment such as sorters, packaging machines, food processors, and the like. In order to retain the solenoid operated valve in a closed position, biasing members such as springs are known.

It is also known, for example, in U.S. Pat. No. 4,598,736 to Chorkey that an inlet pressure of the pressurized fluid can be balanced within the valve to reduce the force required by the solenoid assembly to move a valve member between closed and open positions. Known pressure balanced valve designs have several drawbacks which can include valve seals such as O-rings or D-rings in end pistons of the valve members which provide a moving seal to allow valve member sliding motion, which is also dependent on a surface finish of the bore receiving the D-ring. These seals, however, are susceptible to atmospheric contaminants entering the valve due to seal wear or when equalizing pressure to allow piston movement, and are also susceptible to creep when the valve is pressurized, which increases break-away friction and therefore lengthens valve opening time. Moisture and dirt as contaminants in the valve assembly can enter the solenoid assembly which can result in valve sticking, reduced valve power, delayed operating times, damage to the bore surface finish resulting in D-ring damage, or leakage.

SUMMARY

This section provides a general summary of the disclosure, and is not a comprehensive disclosure of its full scope or all of its features.

According to several embodiments, a diaphragm sealed, pressure balanced valve assembly includes a valve body and a cartridge connected to the valve body. The cartridge includes a first cartridge divider separating an inlet port from an outlet port; a cartridge loading end; and a retaining member threadably engaged to the cartridge loading end. A valve member sliding coaxial to a longitudinal axis of the valve body is partially slidably received in the retaining member. A resilient material diaphragm is fixed to the valve member having a diaphragm body clasped between the retaining member and the cartridge loading end to create a fluid pressure boundary.

According to additional embodiments, a diaphragm sealed, pressure balanced valve assembly includes a valve body and a cartridge connected to the valve body. The cartridge includes a cartridge loading end. A retaining member is engaged to the cartridge loading end. A valve member is sliding coaxial to a longitudinal axis of the valve body. A resilient material first diaphragm is connected to and extends diametrically outward from the valve member, having a diaphragm body clasped between the retaining member and the cartridge loading end, creating a first diaphragm fluid pressure boundary. A resilient material second diaphragm is connected to and extends diametrically outward from the valve member at an opposite end of the valve member with respect to the first diaphragm, and has a diaphragm body clasped between first and second adjustable retention members creating a second diaphragm fluid pressure boundary.

According to further embodiments, a diaphragm sealed, pressure balanced valve assembly includes a valve body and a cartridge connected to the valve body. The cartridge includes a first cartridge divider separating an inlet port from an outlet port; a cartridge loading end; and a retaining member threadably engaged to the cartridge loading end. A valve member is sliding coaxial to a longitudinal axis of the valve body. A resilient material diaphragm is fixed to the valve member having a diaphragm body. A first positive engagement member extends from the retaining member and a second positive engagement member extends from the cartridge loading end and is oppositely facing with respect to the first positive engagement member. The first and second positive engagement members are each partially embedded into the diaphragm body of the diaphragm to create a fluid pressure seal when the retaining member is threadably engaged to the cartridge loading end.

According to still other embodiments, a diaphragm sealed, pressure balanced valve assembly includes a valve body and a cartridge connected to the valve body. The cartridge includes a first cartridge divider separating an inlet port from an outlet port; a cartridge loading end; a retaining member axially adjustably engaged to the cartridge loading end; and a valve member sliding coaxial to a longitudinal axis of the valve body. The valve member is partially slidably received in the retaining member. A piston end of the valve member is slidably and non-sealingly received in a cylinder cavity of the retaining member. A resilient material diaphragm overmolded to the valve member has a diaphragm body clasped between the retaining member and the cartridge loading end to create a fluid pressure boundary.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front elevational view of a balanced valve assembly with a diaphragm end seal of the present disclosure;

FIG. 2 is an end elevational view of the valve assembly of FIG. 1;

Corresponding reference numerals indicate corresponding parts throughout the several views of the drawings.

DETAILED DESCRIPTION

Figure 3:
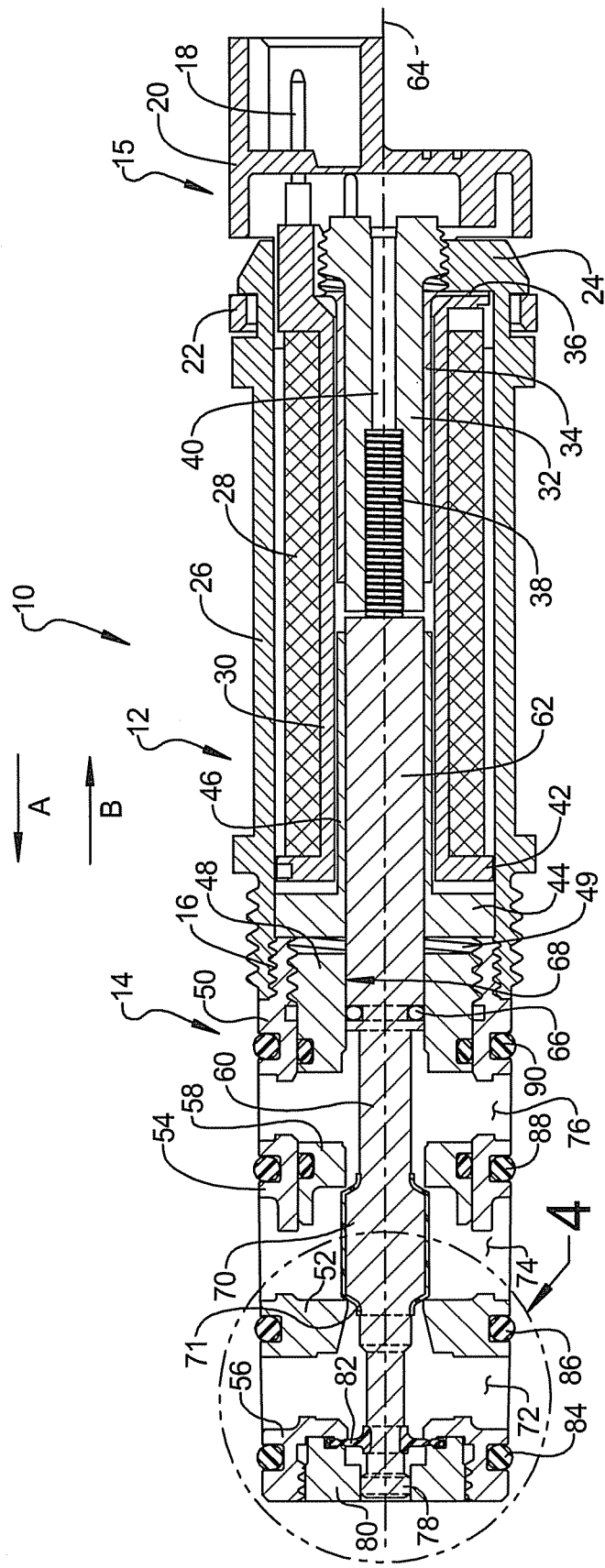
FIG. 3 is a cross sectional front elevational view taken at section 3 of FIG. 2.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "outer", "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIGS. 1 and 2, a valve assembly 10 can include a valve body 12 having a cartridge 14 releasably connected thereto at a first end and a valve head 15 releasably connected to the valve body 12 at an opposite second end. The cartridge 14 can be removed from valve body 12 to provide for replacement of component parts contained therein.

Referring to FIG. 3, a threaded connection 16 can be provided with cartridge 14 such that cartridge 14 can be threadably and therefore releasably connected to valve body 12. At least one power connector 18 can be provided with valve head 15 which is adapted to receive an electrical power connection (not shown) to provide either AC or DC power as required to operate the solenoid actuator of valve assembly 10. Valve head 15 includes a cap portion 20 which can be releasably connected to valve body 12 using a connection ring portion 22 adapted to frictionally engage a body end portion 24 of valve body 12. Valve body 12 can further include a solenoid can 26 which surrounds and contains a coil 28 having a wire coiled to create an electromagnetic field when energized. A coil bobbin 30 provides structural support for coil 28 and is also adapted to receive the power connector 18. A pole piece 32 is axially adjustably positioned, for example using threaded connections at body end portion 24. A bushing 34 is positioned between coil bobbin 30 and pole piece 32 to allow for sliding motion during positional adjustment of pole piece 32. Bushing 34 also includes a bushing flange 36 which helps retain/strengthen the electromagnetic field created by coil 28. A biasing member 38 such as a compression spring is retained within pole piece 32 for a purpose which will be better described in reference to the operation of valve assembly 10 to follow. Pole piece 32 can further include a pressure equalizing passage 40 adapted to allow fluid within coil bobbin 30 to equalize at opposite ends of pole piece 32. A bobbin flange 42 extends radially outwardly with respect to coil bobbin 30 and is oppositely positioned with respect to bushing flange 36. Bobbin flange 42 therefore also provides for containment of coil 28.

An armature receiving member 44 is positioned proximate to bobbin flange 42 and is held in position against bobbin flange 42. A receiving member tube portion 46 of armature receiving member 44 is oriented substantially coaxial with bushing 34 within an inner bore of coil bobbin 30. Armature receiving member 44 is held in position using an adjustable retention member 48 or by a resilient member 49. Adjustable retention member 48 is threadably received proximate to the threaded connection 16 of cartridge 14, and is therefore positioned when cartridge 14 is threadably connected to valve body 12. Resilient member 49 such as an O-ring can be positioned between adjustable retention member 48 and armature receiving member 44 to bias armature receiving member 44 (to the right as viewed in FIG. 3) toward bobbin flange 32 and opposite to the biasing force of biasing member 38. Threaded connection 16 is created in a cartridge connecting end 50 of cartridge 14 and therefore also receives the adjustable retention member 48.

Cartridge 14 can further include a first and second cartridge divider 52, 54 at spaced positions between a cartridge loading end 56 and cartridge connecting end 50. An adjustable seat member 58 extends as a portion of adjustable retention member 48 and is slidably and sealably received within and against second cartridge divider 54. Adjustable seat member 58 is axially displaced by threaded adjustment when adjustable retention member 48 is received in cartridge connecting end 50. A valve member 60, which according to several embodiments defines a poppet valve member, includes a tubular-shaped armature portion 62 which is slidably received within receiving member tube portion 46 of armature receiving member 44. Valve member 60 therefore slides co-axial to a longitudinal axis 64 of valve assembly 10 and valve body 12 when coil 28 is energized or de-energized. A biasing force of biasing member 38 normally biases valve member 60 in a valve closing direction "A" until coil 28 is energized, at which time valve member 60 is displaced in an opposite valve opening direction "B".

A seal member 66 such as an O-ring or D-ring is positioned within a slot or groove formed about the perimeter of armature portion 62. Seal member 66 creates a fluid boundary seal between armature portion 62 and a bore wall 68 of adjustable retention member 48. Seal member 66 therefore creates a fluid boundary between armature portion 62 and adjustable retention member 48 as valve member 60 slides in either of the valve closing direction "A" or the valve opening direction "B". Valve member 60 further includes a raised seat engagement portion 70 that can include an over-molded rubber or resilient material portion 71 which contacts first cartridge divider 52 in a valve closed position and contacts adjustable seat member 58 in a valve open position. In the valve closed position shown in FIG. 3, pressurized fluid in an inlet port 72 is isolated from each of an outlet port 74 and an exhaust port 76. In the valve closed position second cartridge divider 54 is positioned between outlet port 74 and exhaust port 76, and adjustable seat member 58 is in fluid communication with exhaust port 76.

Valve member 60 further includes a piston end 78 which is created opposite to armature portion 62. Piston end 78 is slidably received in a retaining member 80 which is threadably connected to cartridge loading end 56. Piston end 78 is slidably disposed, but is not sealed (i.e., is non-sealingly disposed) with respect to retaining member 80, there being no seal such as an O-ring or D-ring, or the like creating a fluid boundary seal between piston end 78 and retaining member 80. The sliding contact fit between piston end 78 and retaining member 80 is provided to maintain axial alignment of valve member 60 with respect to assembly longitudinal axis 64. To create a fluid boundary seal at the retaining member 80 connection of valve assembly 10, a diaphragm 82 can be physically fixed, bonded or over-molded during creation of diaphragm 82, to valve member 60 having a diaphragm body 83 extending diametrically outward from valve member 60. Diaphragm body 83 is physically clasped by compression between retaining member 80 and cartridge loading end 56 by a compression force created when retaining member 80 is threadably connected to cartridge loading end 56. Diaphragm body 83 is substantially planar in a direction transverse to longitudinal axis 64 to provide for even loading as diaphragm body 83 deflects during valve member motion. Because diaphragm 82 provides the fluid boundary required proximate to inlet port 72 and therefore prevents atmospheric contaminants from entering cartridge 14, no seal member is required between piston end 78 and retaining member 80.

Figure 8:
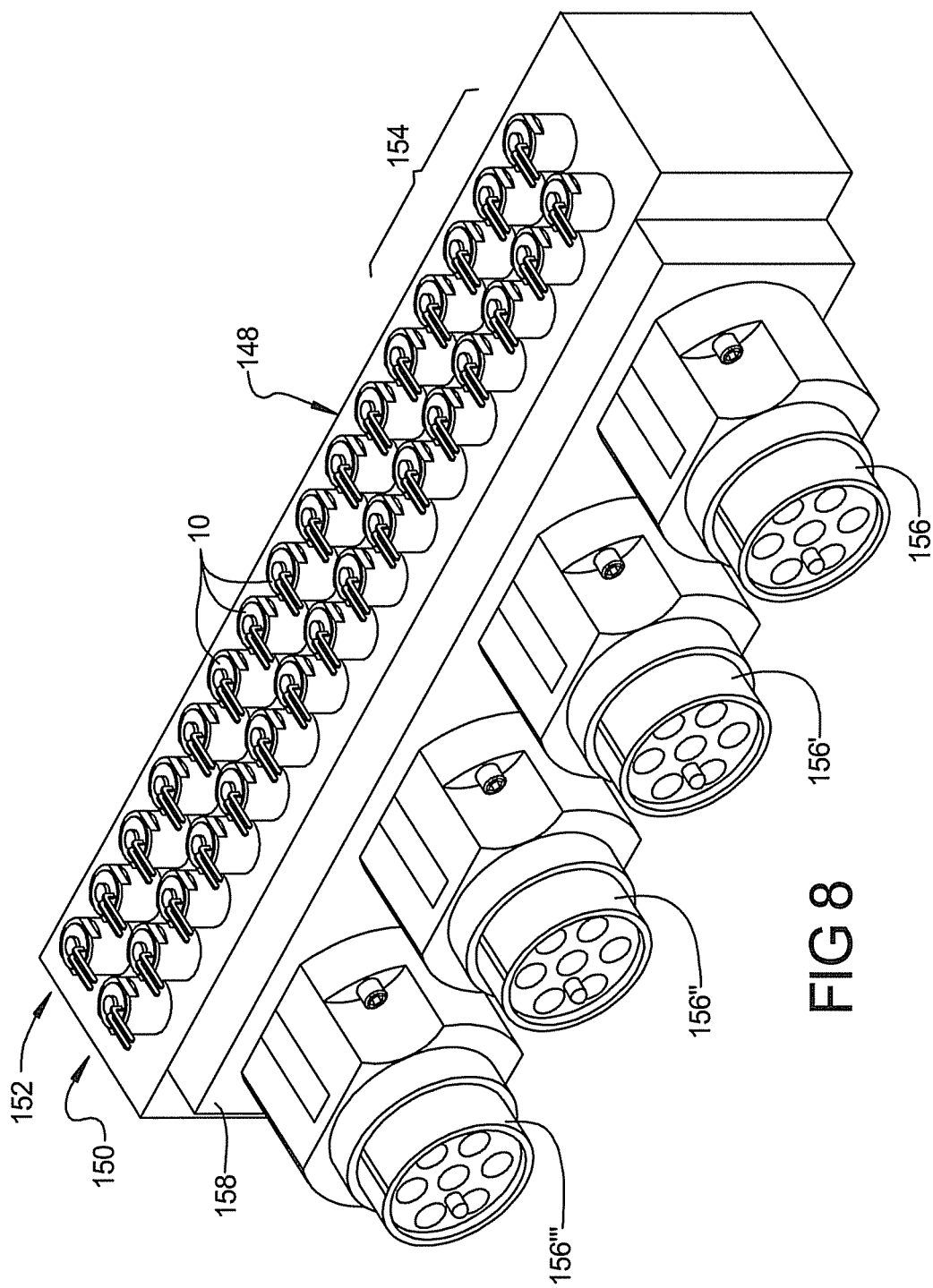
FIG. 8 is a perspective view of a manifold assembly having a plurality of the pressure balanced valves of FIG. 1 in communication with multiple flow distribution devices.

Cartridge 14 can also include a plurality of O-rings or D-rings which allow cartridge 14 to be sealingly received within a manifold (shown and described in reference to FIG. 8). These seal members include each of a first, second, third, and fourth seal member 84, 86, 88, 90. First seal member 84 is received in cartridge loading end 56. Second seal member 86 is received in first cartridge divider 52. Third seal member 88 is received in second cartridge divider 54. Fourth seal member 90 is received in cartridge connecting end 50. Each of the first, second, third and fourth seal members 84, 86, 88, 90 are received in a groove or slot formed about a perimeter of cartridge 14 and assist in providing a fluid boundary between each of the inlet port 72, outlet port 74, and exhaust port 76.

Figure 4:
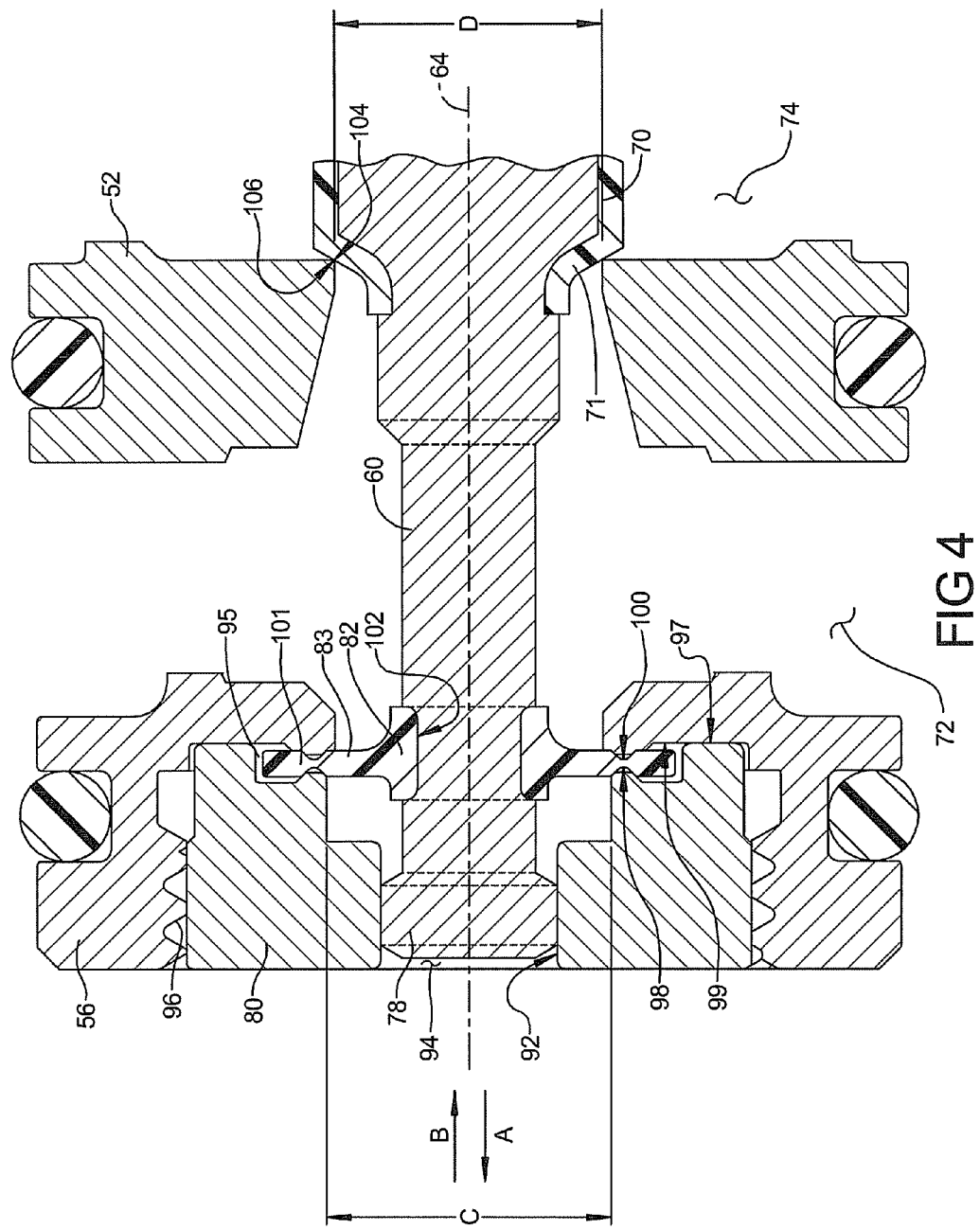
FIG. 4 is a cross sectional front elevational view of area 4 of FIG. 3 showing the valve member in a valve closed position.

Referring to FIG. 4, piston end 78 of valve member 60 is in sliding contact with a cylinder wall 92 defining a cylinder cavity 94 created within retaining member 80 coaxial with the assembly longitudinal axis 64. As previously noted, the sliding fit of piston end 78 allows for fluid such as air to flow past piston end 78 toward or away from diaphragm 82, and maintains axial alignment of valve member 60 within valve assembly 10. Retaining member 80 is adjustably connected to cartridge loading end 56 using a connecting thread 96. Diaphragm 82 is substantially received in a counterbore 95 created in an end face 97 of retaining member 80, allowing a portion of the thickness of diaphragm 82 to extend freely beyond end face 97 for contact with a receiving face 99 of cartridge loading end 56. Retaining member 80 is threadably inserted in the valve opening direction "B" until a diametrical wall portion of diaphragm 82 is compressed between a first positive engagement member 98 extending in the valve opening direction "B" from a face of counterbore 95 of retaining member 80 and an oppositely oriented second positive engagement member 100 extending in the valve closing direction "A" from receiving face 99 of cartridge loading end 56. The first and second positive engagement members 98, 100 elastically deflect and therefore extend partially into a diaphragm diametrical wall 101 of diaphragm 82 to frictionally engage diaphragm 82 and simultaneously create a first fluid boundary seal. A second fluid boundary seal created by diaphragm 82 is defined at a diaphragm engagement interface 102 where diaphragm 82 is physically fixed, adhered, bonded or over-molded to valve member 60.

Resilient material portion 71 of raised seat engagement portion 70 of valve member 60 includes a first engagement surface 104 which contacts a first seat ring 106 created in second cartridge divider 54 defining the valve closed position. Contact between first engagement surface 104 and first seat ring 106 creates a fluid boundary between inlet port 72 and outlet port 74 which together with the fluid boundaries created by first and second positive engagement members 98, 100 plus diaphragm engagement interface 102 provide for a fluid containment boundary for pressurized fluid in inlet port 72 in the valve closed position.

Referring still to FIG. 4 and again to FIG. 3, valve member 60 is defined as "pressure balanced" in the valve closed position due to the following criteria. With a pressurized fluid such as air received in inlet port 72, fluid pressure acts in the valve closing direction "A" on a fluid exposed diameter "C" of diaphragm 82, that is, the surface area portion of diaphragm 82 not sealed between retaining member 80 and cartridge loading end 56, or where bonded to valve member 60 at diaphragm engagement interface 102. Fluid pressure also acts oppositely in the valve opening direction "B" on that portion of first engagement surface 104 of resilient material portion 71 over a first engagement surface exposed diameter "D". Fluid exposed diameter "C" of diaphragm 82 is substantially equal to first engagement surface exposed diameter "D", therefore in the valve closed position, fluid pressure in inlet port 72 acts equally in both valve closing direction "A" and valve opening direction "B", creating a balanced force load on valve member 60. Because the force load is balanced, the operating force required to move valve member 60 away from the closed position only has to overcome the static friction forces of valve member 60 in contact with cartridge 14 and the force required to deflect diaphragm 82 and to compress biasing member 38.

Referring to FIG. 5 and again to FIG. 3, a valve open position is created when coil 28 is energized and valve member 60 is axially translated in the valve opening direction "B" coaxial with assembly longitudinal axis 64. A deflection area 108 of diaphragm 82 retains the fluid pressure boundary created between piston end 78 and cylinder cavity 94 as valve member 60 displaces in the valve opening direction "B". Elastic deflection of diaphragm 82 at deflection area 108 also creates a biasing force acting in the valve closing direction "A" when valve member 60 is moved toward the valve open position. This biasing force is available to help return valve member 60 to the valve closed position. The biasing force of elastically deflected diaphragm 82 therefore decreases a valve closing time "t" of valve assembly 10 when coil 28 is de-energized.

Valve member 60 slides in the valve opening direction "B" until first engagement surface 104 displaces from the first seat ring 106 to create a poppet flow channel 110. At the same time, a second engagement surface 112 of resilient material portion 71 of raised seat engagement portion 70 contacts a second seat ring 114 created in adjustable seat member 58. Contact between second engagement surface 112 and second seat ring 114 isolates fluid in outlet port 74 from exhaust port 76. Pressurized fluid in inlet port 72 is thereafter able to flow toward and out of outlet port 74 via poppet flow channel 110.

Referring still to FIG. 5 and again to FIG. 3, valve member 60 is also defined as "pressure balanced" in the valve open position due to the following criteria. With the pressurized fluid such as air received in inlet port 72, fluid pressure acts in the valve closing direction "A" on fluid exposed diameter "C" of diaphragm 82 as previously described. Fluid pressure also acts oppositely in the valve opening direction "B" on resilient material portion 71 of raised seat engagement portion 70 at the interface between second engagement surface 112 and second seat ring 114, over a second engagement surface exposed diameter "E". Fluid exposed diameter "C" of diaphragm 82 is substantially equal to second engagement surface exposed diameter "E", therefore, in the valve open position, fluid pressure from inlet port 72 acts equally in both valve closing direction "A" and valve opening direction "B", creating a balanced fluid force load on valve member 60.

As previously noted, adjustable seat member 58 is axially adjustable in either the valve closing direction "A" or the valve opening direction "B" coaxial with assembly longitudinal axis 64. This permits the total displacement of raised seat engagement portion 70 to be adjusted, increasing or decreasing the poppet flow channel 110 size as well as the total travel time between valve open and valve closed positions of valve assembly 10. It is additionally noted that either or both of first engagement surface 104 and second engagement surface 112 can be metal material surfaces or can be created by over-molding a resilient material such as rubber or a polymeric material. To provide an additional fluid boundary seal when valve member 60 is repositioned to the valve open position, a seal member 118 such as an O-ring or D-ring is positioned between adjustable seat member 58 and a seat member interface surface 116 of cartridge connecting end 50.

Figure 6:
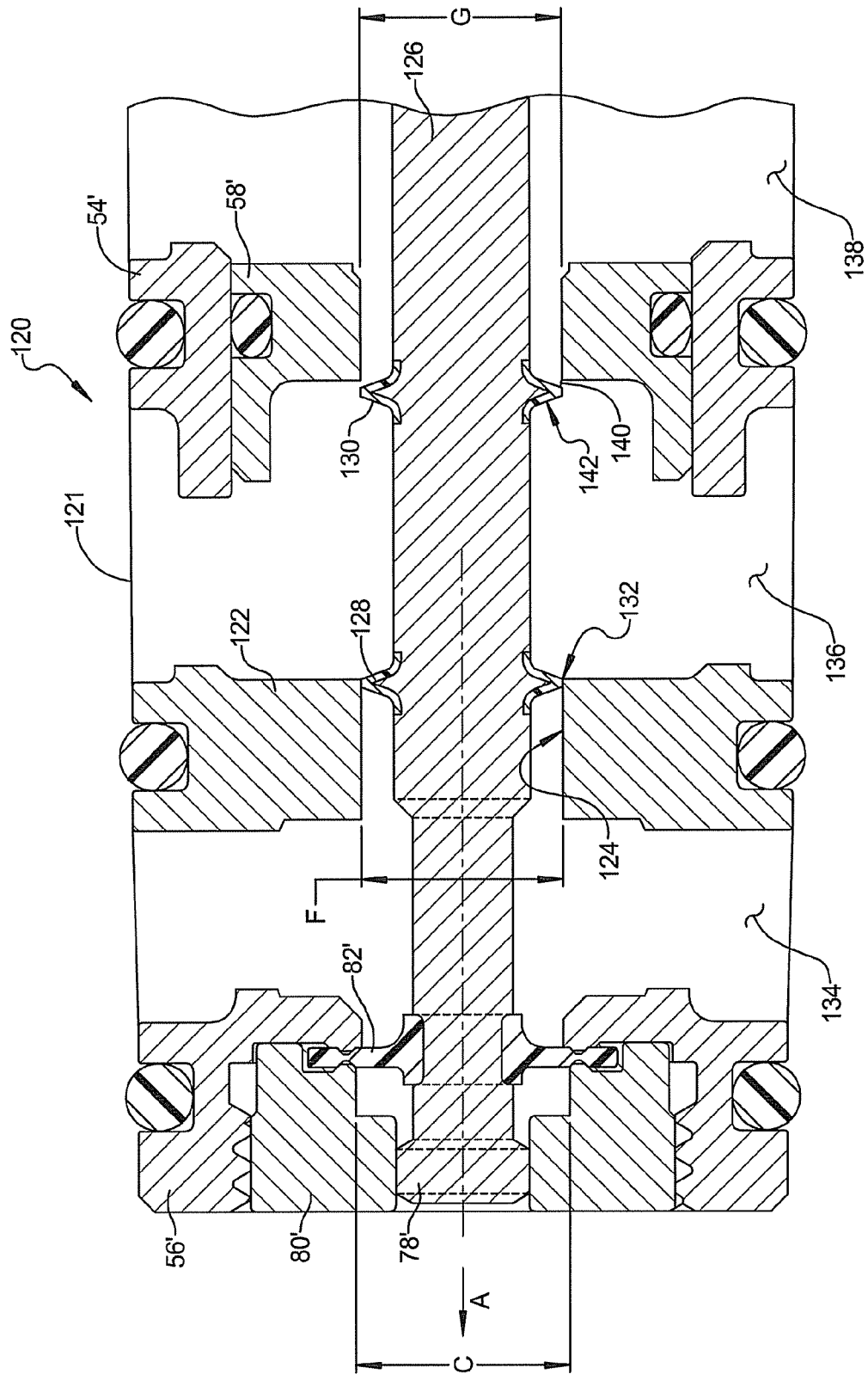
FIG. 6 is a cross sectional front elevational view similar to FIG. 5, showing another embodiment of a balanced spool valve in a valve closed position.

Referring to FIG. 6 and again to FIG. 3, according to additional embodiments of the present disclosure a valve assembly 120 includes a cartridge 121 which can be substituted on valve body 12 for cartridge 14. Cartridge 121 is modified from cartridge 14 to include a cartridge divider 122 having a cylindrical wall first spool member receiving surface 124. A spool valve member 126 replaces valve member 60 of cartridge 14, and includes a first spool ring 128 and a second spool ring 130, each created as a resilient material overmolded onto spool valve member 126. In the valve closed position shown in FIG. 6, a first spool ring engagement surface 132 of first spool ring 128 contacts the first spool member receiving surface 124 of cartridge divider 122. This creates a fluid boundary seal between an inlet port 134 and each of an outlet port 136 and an exhaust port 138. A diaphragm 82' is similarly connected to a retaining member 80' and a cartridge loading end 56' to provide a fluid pressure boundary seal for pressurized fluid in inlet port 134 from escaping through or past a piston end 78'.

In the valve closed position shown, a first spool flow channel 140 is created between a second spool ring engagement surface 142 and adjustable seat member 58'. Fluid in outlet port 136 is therefore vented through exhaust port 138 via first spool flow channel 140. Similar to the previous embodiments, adjustable seat member 58' is axially adjustable to control the displacement required between valve open and valve closed positions of valve assembly 120. Also similar to the previous embodiments, each of the first and second spool rings 128, 130 can be a metal material or over-molded resilient material such as rubber or a polymeric material.

Figure 7:
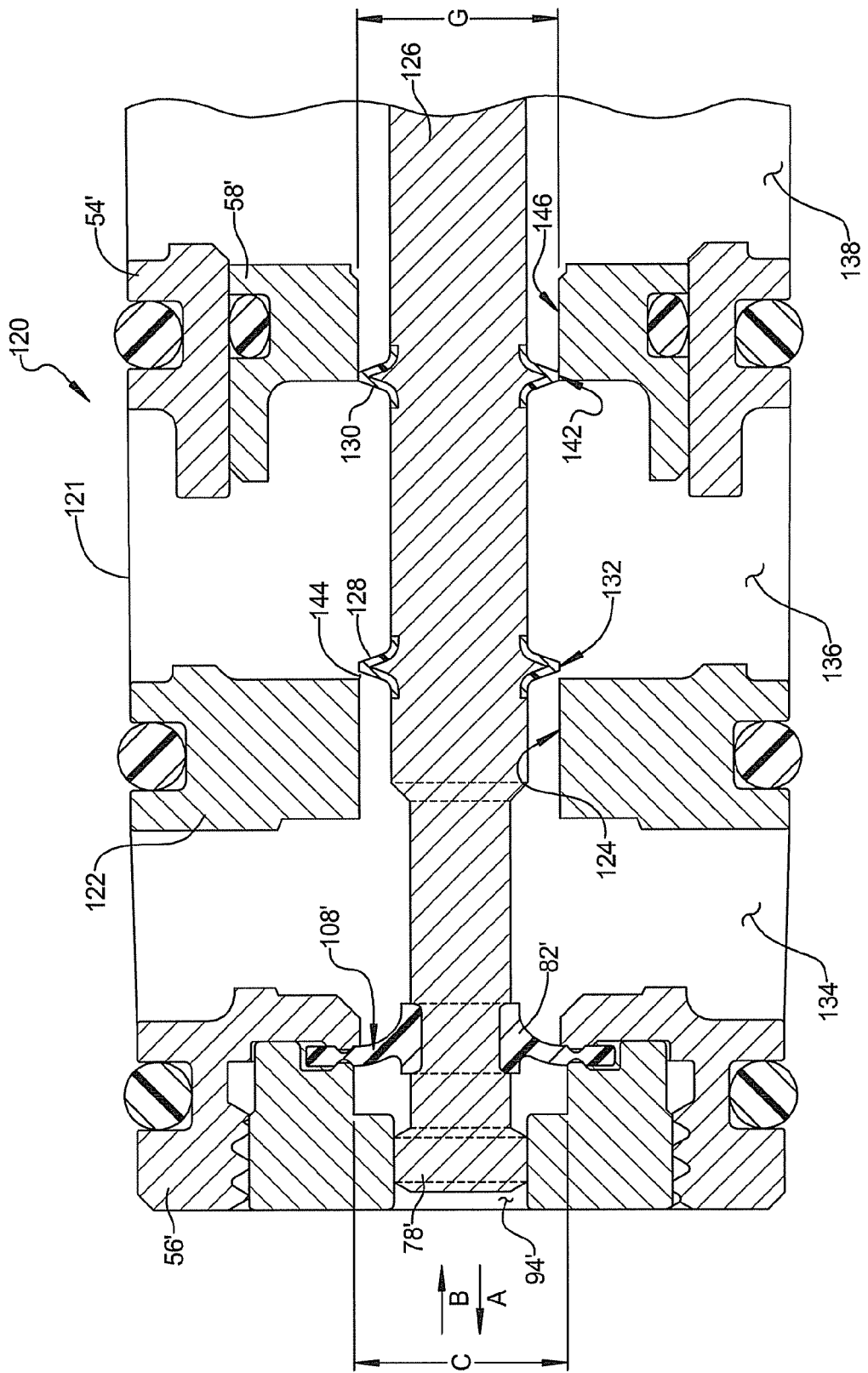
FIG. 7 is the cross sectional front elevational view of FIG. 6, modified to show a valve open position.

Referring to FIG. 7, when spool valve member 126 is axially displaced in the valve opening direction "B", piston end 78' co-displaces in the valve opening direction "B" increasing a volume of cylinder cavity 94' and deflecting diaphragm 82' at a deflection area 108'. First spool ring engagement surface 132 is displaced from contact with first spool member receiving surface 124, creating a second spool flow channel 144. Simultaneously, second spool ring engagement surface 142 of second spool ring 130 contacts a second spool member receiving surface 146 of first cartridge divider 52', creating a fluid boundary between outlet port 136 and exhaust port 138. Pressurized fluid in inlet port 134 can thereby flow out of outlet port 136 in the valve open position with fluid pressure boundaries created by diaphragm 82' and second spool ring engagement surface 142. Axial displacement of spool valve member 126 in the valve opening direction "B" also creates a biasing force at deflection area 108' of diaphragm 82' which assists returning spool valve member 126 in the valve closing direction "A" when the valve is de-energized.

Referring now to FIG. 8, a plurality of valve assemblies of the present disclosure can be commonly connected to a manifold as a space and costs saving measure, for operation of multiple components by the valve assemblies. In an exemplary embodiment, a plurality of valve assemblies 10 are threadably connected into individual threaded receiving apertures of a manifold block 148. The valve assemblies 10 can be arranged in substantially parallel rows, indicated by first and second rows 150, 152. Groups of the valve assemblies 10, as shown by an exemplary valve assembly group 154, can be commonly connected to one or more flow distribution devices 156. In the present configuration, group 154 includes eight valve assemblies 10 which are commonly connected by internal flow passages (not shown) of manifold block 148 and a device mounting block 158 to flow distribution device 156. Additional groups of valve assemblies 10 can in turn be connected to each of flow distribution devices 156', 156", and 156'". The quantity of valve assemblies and flow distribution devices is not limited by the exemplary configuration shown, and can vary at the discretion of the manufacturer. Grouping multiple ones of the valve assemblies also provides for ease in making the electrical connections to the valve assemblies, as a wiring harness (not shown) can be used to electrically energize multiple valve assemblies.

Figure 5:
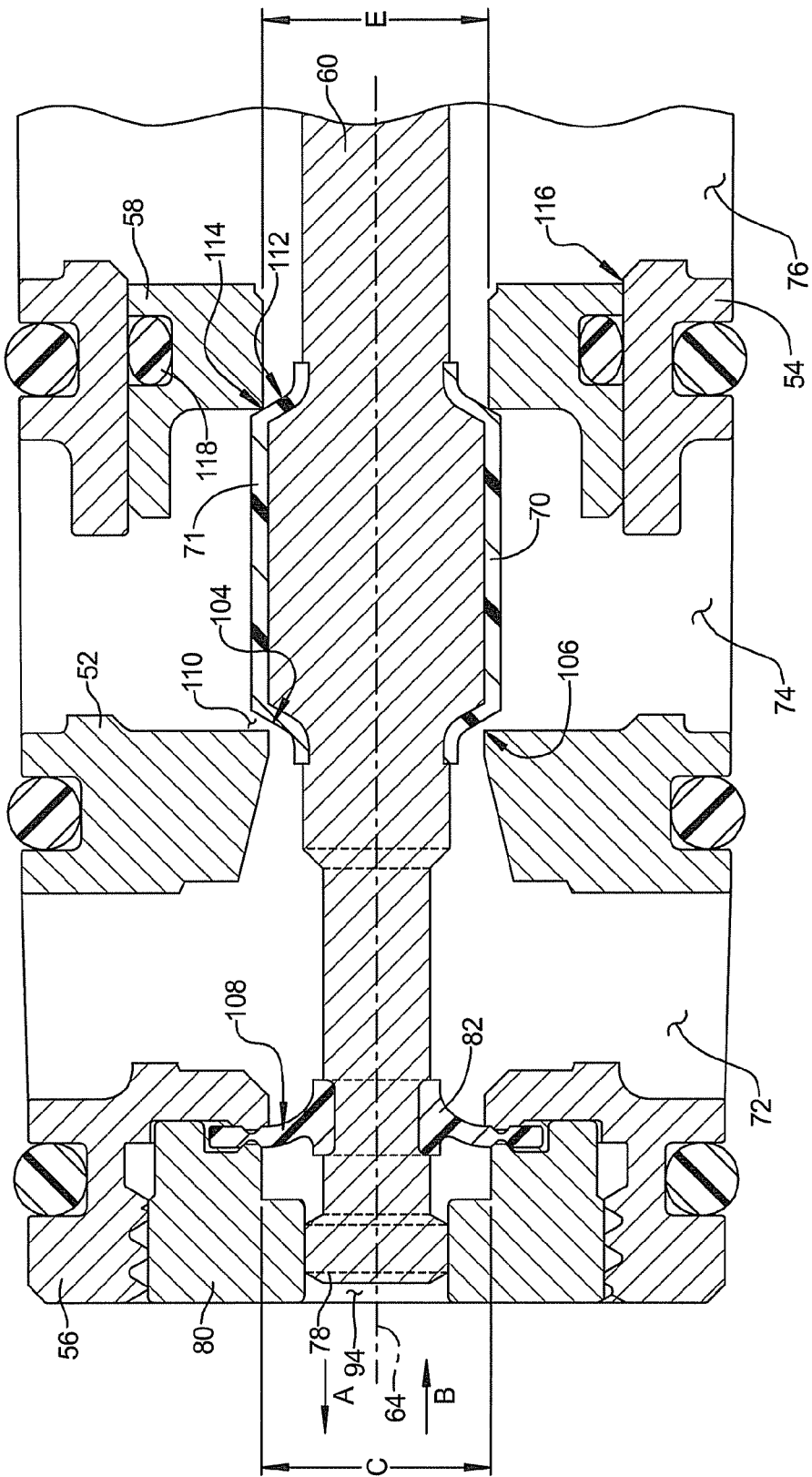
FIG. 5 is a cross sectional front elevational view modified from FIG. 4 to further include the valve member moved to a valve open position.

Referring to FIG. 9 and again to FIGS. 3 and 5, a valve assembly 160 has been modified from valve assembly 10. The one-piece valve member 60 of valve assembly 10 has been replaced by a multiple piece valve member assembly 162. Valve member assembly 162 includes an armature portion 164 which is releasably connected to a valve member portion 166 using a male threaded end 168 of armature portion 164 threadably connected to a female threaded end 170 of valve member portion 166. A piston portion 172 is threadably connected at a piston portion male threaded connector end 174 to a female threaded connector end 176 of valve member portion 166 which is oppositely positioned with respect to female threaded end 170. Diaphragm 82' is overmolded onto piston portion 172 and a piston member 178 integrally connected to piston portion 172 performs a similar function as piston end 78.

The seal member 66 of valve assembly 10 has been replaced by a second diaphragm 180 over-molded onto modified armature portion 164 at a slot 182. An opposite end of second diaphragm 180 is compressible and is positioned within a cavity 184 located between an adjustable retention member 186 modified from adjustable retention member 48 and a contact member 188. A threaded end 190 of adjustable retention member 186 has an external male thread engaged with cartridge connecting end 50' and an internal female thread engaged to an external male thread of contact member 188. Adjustable retention member 186 and contact member 188 are both retained within cartridge connecting end 50' which is threadably connected to solenoid can 26' by threaded connection 16'.

Figure 9:
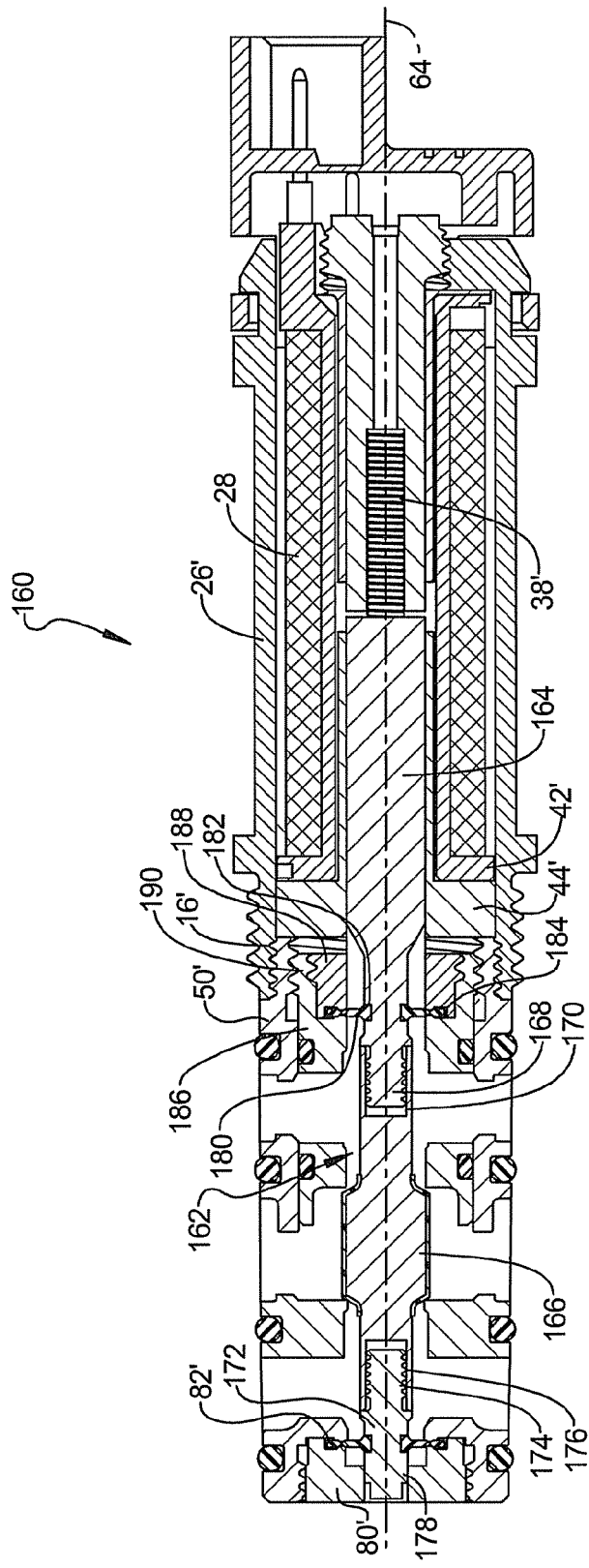
FIG. 9 is a cross sectional front elevational view of another embodiment modified from the embodiment of FIG. 3.

Second diaphragm 180 provides a second axially and elastically deflectable sealing member providing a similar biasing force as diaphragm 82' when deflected from the valve closed position shown in FIG. 9 to the valve open position similar to the position shown in FIG. 5. Second diaphragm 180 provides an improved fluid seal at the junction with armature portion 164 compared to seal member 66. This additional biasing force provides a valve closing time "$t_2$" for the valve assembly 160 that is less than or equal to valve closing time "t" previously described herein. The configuration including second diaphragm 180 also permits the designated valve inlet to be moved to alternate ones of the valve ports, thereby providing different valve functionality (e.g., normally open or normally closed configurations) and further mitigates against contaminant entry into the solenoid actuator.

Referring to FIG. 10 and again to FIGS. 3 and 4, according to a further embodiment, a valve assembly 200 includes a diaphragm installation and capture design modified from the design that retains diaphragm 82. Valve assembly 200 incorporates many of the same features of valve assembly 10; therefore, only the differences with be discussed further herein. Valve assembly 200 provides a modified valve member 202 including an integrally connected armature portion 204 which is similar in design and function as armature portion 62, but provides a diaphragm attachment end 206 defining an opposite or second end of the valve member 202 which is modified from valve member 60.

Diaphragm attachment end 206 is slidably disposed in a cartridge loading end 208 which is modified from cartridge loading end 56 such that cartridge loading end 208 directly slidably receives the diaphragm attachment end 206. A retaining member 210 is threadably engaged with cartridge loading end 208, but is modified from retaining member 80 in several ways which will be described in greater detail below. A resilient, elastically deflected material second diaphragm 212 is modified from first diaphragm 82 in that second diaphragm 212 requires compression engagement at opposite ends and is therefore not fixed by over-molding or bonding to diaphragm attachment end 206. In lieu of bonding diaphragm 212 to diaphragm attachment end 206, a diaphragm retention fastener 214 installed in an installation direction "H" partially compresses diaphragm 212 against diaphragm attachment end 206. Diaphragm 212 is also partially compressed at its interface with each of cartridge loading end 208 and retaining member 210; therefore, two pressure boundaries are created with diaphragm 212.

Figure 10:
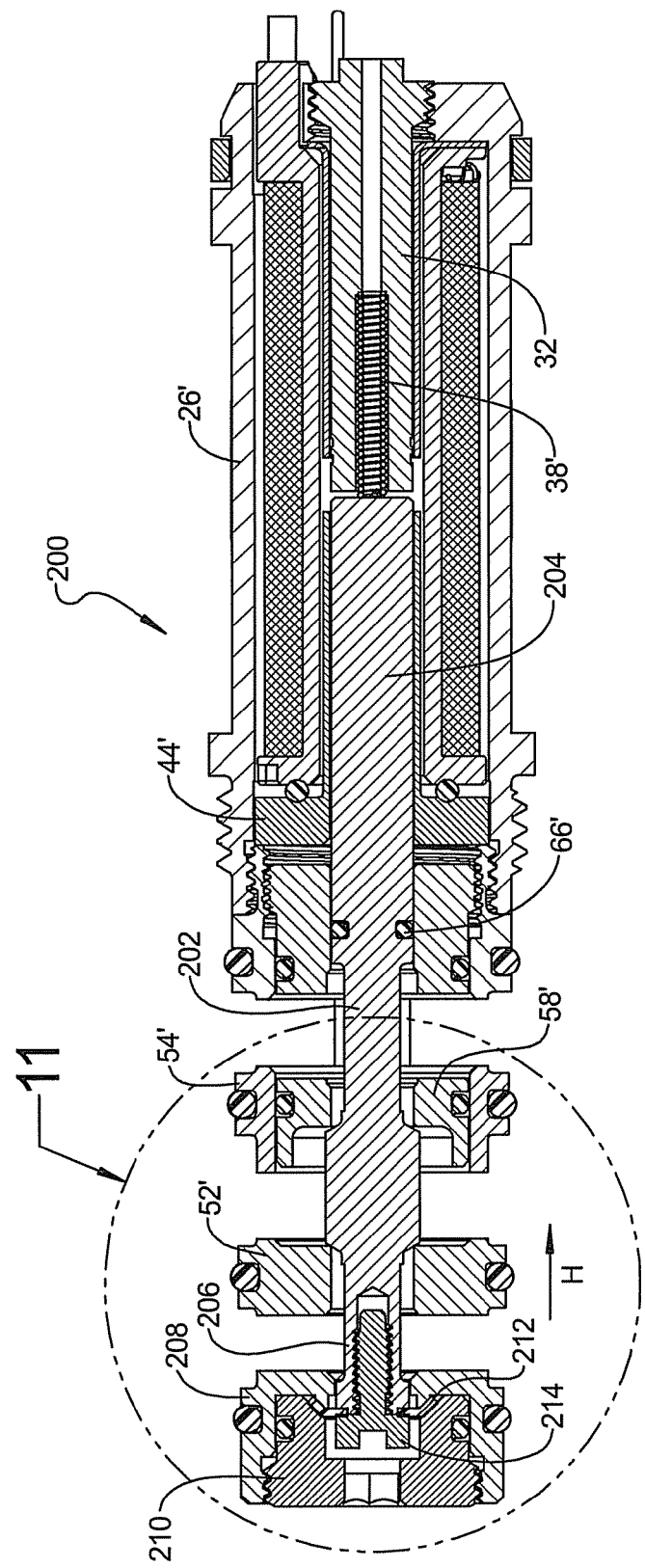
FIG. 10 is a cross sectional front elevational view similar to FIG. 3 showing another embodiment of the disclosure.
Figure 11:
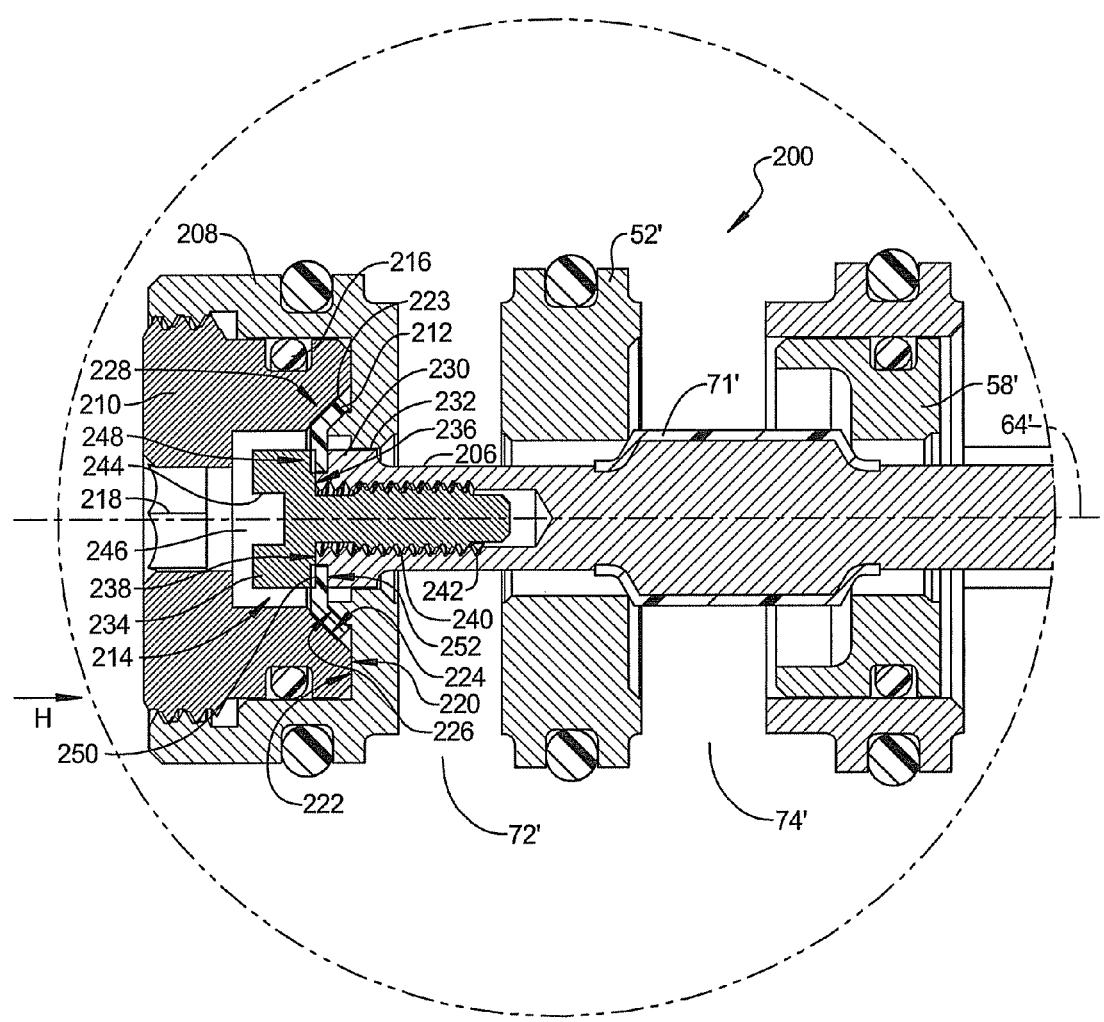
FIG. 11 is a cross sectional front elevational view of area 11 of FIG. 10.

Referring to FIG. 11 and again to FIGS. 3, 4 and 10, a retaining member seal 216 such as an O-ring or D-ring can be provided between cartridge loading end 208 and retaining member 210 to provide an additional seal capability in addition to diaphragm 212. By eliminating the piston end 78 from diaphragm attachment end 206, retaining member 210 can include a hex drive opening 218 which receives a hex drive tool (not shown) to axially rotate retaining member 210 during installation and seating against diaphragm 212. A metal-to-metal contact is created at the fully seated position of retaining member 210 against cartridge loading end 208 which occurs between a retaining member end face 220 and a cartridge loading end inner wall 222. This metal-to-metal contact both creates and limits a diaphragm interference zone 223 at a location where a first diaphragm engagement face 224 of retaining member 210 contacts and partially compresses diaphragm 212. First diaphragm engagement face 224 is oppositely positioned with respect to a second diaphragm engagement face 226 created in cartridge loading end 208. The partial compression of diaphragm 212 between first and second diaphragm engagement faces 224, 226 creates a first pressure boundary 228 between fluid present in inlet port 72' and the atmosphere at hex drive opening 218.

Cartridge loading end 208 includes a piston receiving bore 232 which is coaxially aligned with assembly longitudinal axis 64'. When diaphragm retention fastener 214 is threadably engaged to diaphragm attachment end 206, a fastener head 234 directly contacts and partially compresses diaphragm 212 when a fastener head contact face 236 directly contacts a piston member contact face 238 of piston member 230. This direct metal-to-metal contact between fastener head contact face 236 and piston member contact face 238 limits the partial compression of diaphragm 212. Diaphragm retention fastener 214 also includes a fastener threaded shank 240 which is threadably received in a threaded blind bore created through piston member 230 and extends co-axially with respect to assembly longitudinal axis 64' partially through diaphragm attachment end 206. Diaphragm retention fastener 214 includes a fastener drive slot 244 created in fastener head 234 to provide for axial rotation of and torque application to diaphragm retention fastener 214. Fastener head 234 is positioned in a retaining member cavity 246 of retaining member 210 and can have a greater diameter than hex drive opening 218; therefore, diaphragm retention fastener 214 can be installed prior to installation of retaining member 210.

As fastener head 234 contacts and partially compresses diaphragm 212, a second pressure boundary 248 is created between fluid present in inlet port 72' and the atmosphere at hex drive opening 218. Partial compression of diaphragm 212 creates a second diaphragm interference zone 250 which is limited in axial dimension by a depth of a diaphragm receiving counterbore 252 created in the piston member contact face 238 that receives a partial thickness of diaphragm 212. First and second diaphragm interference zones 223, 250 define predetermined diaphragm compression which promotes reproducible diaphragm compression and therefore predictable sealing properties between different valve assemblies 200. The predetermined diaphragm compression can range between approximately 5% to approximately 50% or more of the thickness of diaphragm 212.

Figure 12:
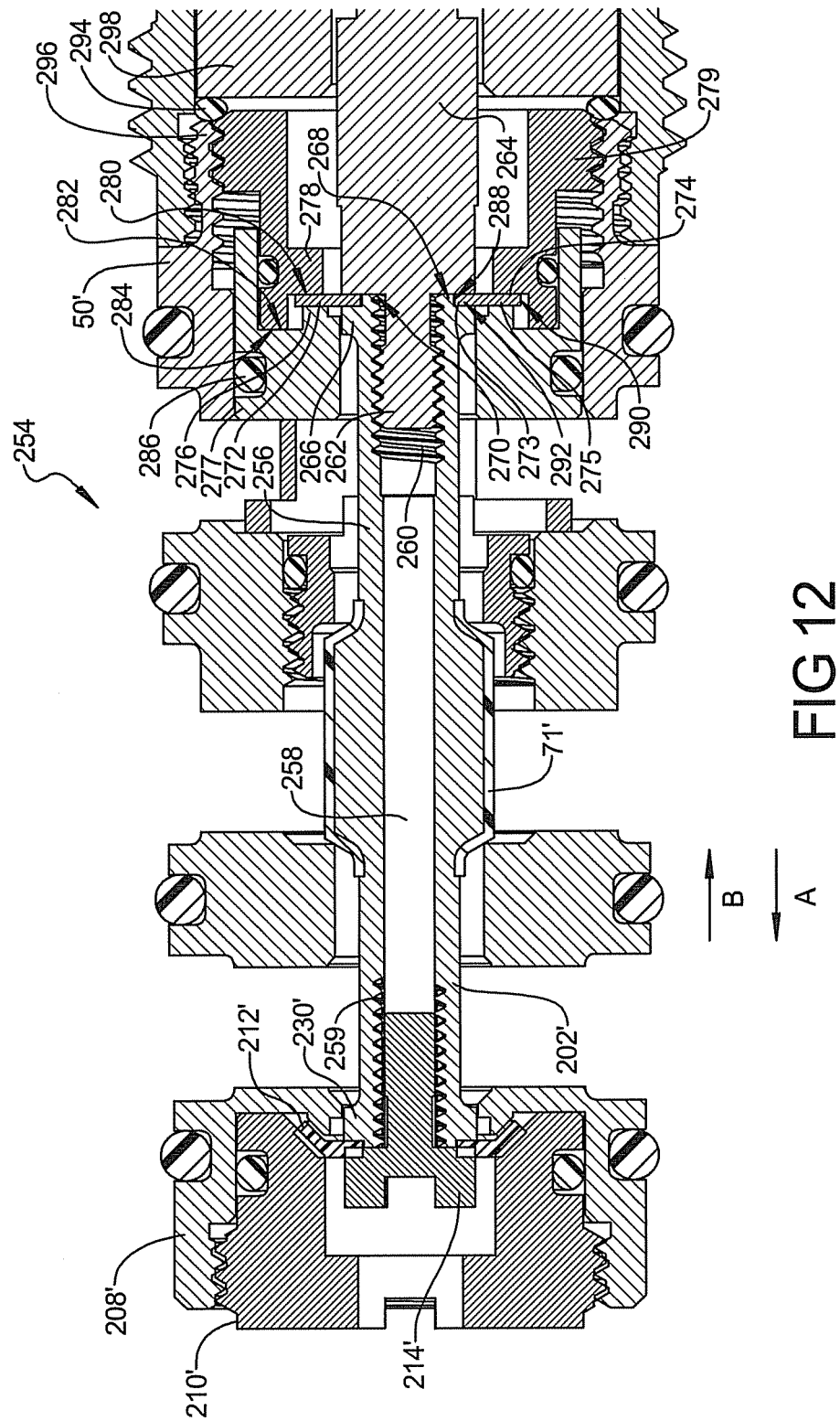
FIG. 12 is a cross sectional front elevational view similar to FIG. 10 of a further embodiment of the disclosure having two diaphragm seals.

Referring to FIG. 12 and again to FIGS. 3, 4 and 9-11, a valve assembly 254 is modified from valve assembly 200 to further add a second diaphragm at an opposite end of the valve member with respect to diaphragm 212' and to provide a separate, non-integrally connected armature member. Because multiple components associated with diaphragm 212' are similar to those discussed with respect to valve assembly 200, only the differences will be further discussed. Valve assembly 254 includes a continuous through bore 258 extending axially through an entire length of valve assembly 254. A first threaded bore portion 259 is similar to threaded blind bore 242, and a second threaded bore portion 260 is created at an opposite end of valve assembly 254 to threadably receive an armature member threaded shank 262 which extends axially from an armature member 264. Valve assembly 254 further includes a second piston member 266 at an opposite end of valve assembly 254 with respect to piston member 230'.

By separating valve assembly 254 and armature member 264 into different component parts, when a piston member second contact face 268 of second piston member 266 directly contacts an armature member contact face 270, space can be provided between the contact faces to incorporate and partially compress a resilient, elastically deflectable material second diaphragm 272 at a first diaphragm portion 273. This partial compression of second diaphragm 272 creates a second diaphragm first interference zone 274. An opposite second diaphragm portion 275 is positioned between and partially compressed by a first diaphragm engagement element 276 of a first adjustable retention member 277 and a second diaphragm engagement element 278 of a second adjustable retention member 279. This partial compression of second diaphragm 272 creates a second diaphragm second interference zone 280. The amount of deflection of second diaphragm 272 in the second diaphragm second interference zone 280 is limited when a metal-to-metal contact occurs between a first adjustable retention member contact face 282 and a second adjustable retention member contact face 284. Second diaphragm first and second interference zones 274, 280 also define predetermined diaphragm compression which promotes reproducible diaphragm compression and therefore predictable sealing properties between different valve assemblies 254. The predetermined diaphragm compression can range between approximately 5% to approximately 50% or more of the thickness of second diaphragm 272. Second diaphragm 272 sealing can also be enhanced by addition of a seal member 286 such as an O-ring or D-ring positioned between first adjustable retention member 277 and cartridge connecting end 50'.

A recess or counterbore 288 is created in the piston member second contact face 268 to receive a portion of first diaphragm portion 273 of second diaphragm 272. Counterbore 288 predetermines the amount of compression of first diaphragm portion 273 when metal-to-metal contact occurs between piston member second contact face 268 and armature member contact face 270. Counterbore 288 also prevents crushing first diaphragm portion 273 while providing a positive grip to retain second diaphragm 270 during axial displacement of valve member 256 in either of the valve closing or opening directions "A" or "B". Compression of the material of second diaphragm 270 creates each of a third pressure boundary seal 290 and a fourth pressure boundary seal 292. To further seal against atmospheric contaminants and/or moisture from entering the solenoid portion, a seal member 294 such as an O-ring or D-ring can be positioned at an intersection of second adjustable retention member 279, a double threaded engagement end 296 of cartridge connecting end 50', and an armature receiving member 298. Seal member 294 also provides a biasing force when partially compressed to maintain a clearance space between second adjustable retention member 279 and armature receiving member 298.

During operation, and referring again to FIGS. 12 and 9, a magnetic force acting on armature member 264 slidably displaces valve member 256 in the valve opening direction "B", thereby deflecting both first and second diaphragms 212' and 272. A biasing force created by the elastic deflection of first and second diaphragms 212' and 272, plus the biasing force from the partially compressed biasing member 38', act to help return valve member 256 in the valve closing direction "A" when the coil 28 is de-energized. Pressure forces are also balanced in both the valve open and closed positions of valve assembly 254. A fluid pressure force acting on piston member 230' is substantially equal and opposite to a fluid pressure force acting on resilient material portion 71' of raised seat engagement portion 70 in the valve closed position. A fluid pressure force acting on second piston member 266 is substantially equal and opposite to a fluid pressure force acting on resilient material portion 71' of raised seat engagement portion 70 in the valve open position.

Pressure balanced valves with diaphragm valve member end seals of the present disclosure offer several advantages. By fixing such as by over-molding, bonding or compressing a resilient material first diaphragm to a valve member at a first end of the valve member, the diaphragm can be compressed about its diameter to create a pressure seal, with the fixed interface creating a second pressure boundary seal. In other embodiments a resilient material second diaphragm is positioned proximate to or at a second end of the valve member and operates to create an additional biasing force when the valve member is displaced, similar to the first diaphragm. Because the first and second diaphragms can be substantially planar, angular or relaxed in a predetermined orientation in one position of the valve, such as the valve closed position, subsequent movement of the valve member elastically deflects the diaphragms, thereby creating a biasing force that subsequently assists in returning the valve member to the closed position. A first or second diaphragm of the present disclosure also eliminates the need for an O-ring or D-ring seal at the valve member ends, which eliminates frictional wear associated with O-ring or D-ring seals due to repeated valve member sliding motion. The positive engagement members and/or the use of counterbores at valve member end faces of the present disclosure act to partially compress the diaphragms, thereby creating a pressure boundary and also acting to frictionally retaining the diaphragm.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A diaphragm sealed, pressure balanced valve assembly, comprising:
   a valve body; and
   a cartridge connected to the valve body, the cartridge including:
      a cartridge loading end;
      a retaining member engaged to the cartridge loading end;
      a valve member sliding coaxial to a longitudinal axis of the valve body;
      a resilient material diaphragm connected to and extending diametrically outward from the valve member having a diaphragm body clasped between the retaining member and the cartridge loading end creating a fluid pressure boundary;
      a piston end slidably received in a cylinder cavity of the retaining member; and
      an armature portion oppositely oriented with respect to the piston end;
      wherein when the armature portion of the valve member is slidably moved coaxially to the longitudinal axis of the valve body to a valve open position a biasing force is created by the diaphragm when the diaphragm body elastically deflects between a valve closed position and the valve open position, the biasing force subsequently assisting sliding movement of the valve member thereby decreasing a valve closing time to reach the valve closed position when the coil is de-energized.

2. The pressure balanced valve assembly of claim 1, further including:
   a first cartridge divider separating an inlet port from an outlet port;
   a second cartridge divider separating the outlet port from an exhaust port; and
   a first engagement surface of the valve member contacting a first seat ring of the first cartridge divider in a valve closed position, wherein in the valve closed position the inlet port is isolated from the outlet port and the outlet and exhaust ports are in fluid communication with each other.

3. The pressure balanced valve assembly of claim 2, further including a seat member selectively axially positioned in the cartridge and sealed against the second cartridge divider.

4. The pressure balanced valve assembly of claim 3, further including:
   a second engagement surface of the valve member; and
   a second seat ring created in the seat member contacted by the second engagement surface of the valve member in a valve open position, wherein in the valve open position the inlet port is in fluid communication with the outlet port and the outlet port is isolated from the exhaust port.

5. The pressure balanced valve assembly of claim 4, wherein a fluid exposed diameter of the diaphragm body is substantially equal to a first engagement surface exposed diameter of the first engagement surface in the valve closed position, and the fluid exposed diameter of the diaphragm body is substantially equal to a second engagement surface exposed diameter of the second engagement surface in the valve open position defining a pressure balanced condition of the valve member in each of the valve open position and a valve closed position.

6. The pressure balanced valve assembly of claim 1, wherein the valve body further includes:
   a coil bobbin; and
   a coil retained by the coil bobbin;
   wherein when the coil is energized the armature portion is magnetically acted on by the coil, slidably moving the valve member coaxial to the longitudinal axis of the valve body to the valve open position with the diaphragm body clasped between the retaining member and the cartridge loading end thereby elastically deflecting the diaphragm body.

7. The pressure balanced valve assembly of claim 1, further including:
   a first positive engagement member extending from the retaining member; and
   a second positive engagement member extending from the cartridge loading end and positioned opposite the first positive engagement member, the first and second positive engagement members each partially embedded into the radial wall of the diaphragm to create a fluid pressure seal.

8. The pressure balanced valve assembly of claim 1, further including:
   a first cartridge divider separating an inlet port from an outlet port;
   a second cartridge divider separating the outlet port from an exhaust port; and
   a first spool ring of the valve member contacting a first receiving surface of the first cartridge divider in a valve closed position isolating the inlet port from the outlet port and positioning the outlet and exhaust ports in fluid communication with each other.

9. The pressure balanced valve assembly of claim 8, further including an axially adjustable seat member slidably sealing against the second cartridge divider.

10. The pressure balanced valve assembly of claim 9, further comprising:
    a second spool ring of the valve member; and
    a second spool member receiving surface of the seat member contacted by the second spool ring in the valve open position, positioning the inlet port in fluid communication with the outlet port and isolating the outlet port from the exhaust port.

11. The pressure balanced valve assembly of claim 10, wherein a fluid exposed diameter of the diaphragm body is substantially equal to a first spool member receiving surface diameter of the first cartridge divider in the valve closed position, and the fluid exposed diameter of the diaphragm body is substantially equal to a second spool member receiving surface diameter of the axially adjustable seat member in the valve open position thereby defining a pressure balanced condition of the valve member in each of the valve open and closed positions.

12. The pressure balanced valve assembly of claim 1, wherein the valve member is partially slidably received in the retaining member, and the valve member includes a valve member assembly having a second resilient material diaphragm fixedly connected to an armature portion of the valve member assembly to create a second fluid pressure boundary.

13. The pressure balanced valve assembly of claim 1, wherein the diaphragm is fixedly connected to the valve member.

14. The pressure balanced valve assembly of claim 1, wherein the diaphragm is further clasped between a piston member defining an end of the valve member and a diaphragm retention fastener engaged with the piston member creating a second fluid pressure boundary.

15. The pressure balanced valve assembly of claim 1, further including:
   an armature member connected to a piston member of the valve member; and
   a resilient material second diaphragm having a first portion clasped between the piston member and the armature member and extending diametrically outward from the valve member, the second diaphragm having a second portion clasped between first and second adjustable retention members.

16. A diaphragm sealed, pressure balanced valve assembly, comprising:
   a valve body; and
   a cartridge connected to the valve body, the cartridge including:
      a cartridge loading end;
      a retaining member engaged to the cartridge loading end;
      a valve member sliding coaxial to a longitudinal axis of the valve body between a valve open position and a valve closed position;
      a resilient material first diaphragm connected to and extending diametrically outward from the valve member having a diaphragm body clasped between the retaining member and the cartridge loading end, creating a first diaphragm fluid pressure boundary; and
      a resilient material second diaphragm connected to and extending diametrically outward from the valve member at an opposite end of the valve member with respect to the first diaphragm and having a diaphragm body clasped between first and second adjustable retention members, creating a second diaphragm fluid pressure boundary;
      wherein a biasing force is created by the resilient material first and second diaphragms when the diaphragm body of the resilient material first and second diaphragms elastically deflects in response to the valve member sliding from the valve closed position to the valve open position, the biasing force decreasing a valve closing time by subsequently assisting sliding movement of the valve member back to the valve closed position.

17. The pressure balanced valve assembly of claim 16, further including:
   a piston member of the valve member; and
   an armature member connected to the piston member.

18. The pressure balanced valve assembly of claim 17, wherein the resilient material second diaphragm has a first portion clasped between the piston member and the armature member and extending diametrically outward from the valve member.

19. The pressure balanced valve assembly of claim 18, wherein the second diaphragm includes a second portion clasped between the first and second adjustable retention members.

20. The pressure balanced valve assembly of claim 16, wherein the first diaphragm is further clasped between a piston member defining a first end of the valve member and a diaphragm retention fastener engaged with the piston member.

21. A diaphragm sealed, pressure balanced valve assembly, comprising:
   a valve body; and
   a cartridge connected to the valve body, the cartridge including:
      a first cartridge divider separating an inlet port from an outlet port;
      a cartridge loading end;
      a retaining member threadably engaged to the cartridge loading end;
      a valve member sliding coaxial to a longitudinal axis of the valve body between a valve open position and a valve closed position;
      a resilient material diaphragm fixed to the valve member having a diaphragm body extending diametrically from the valve member; and
      a first positive engagement member extending from the retaining member and a second positive engagement member extending from the cartridge loading end and oppositely facing with respect to the first positive engagement member, the first and second positive engagement members each partially embedding into the diaphragm body of the diaphragm to create a fluid pressure seal when the retaining member is threadably engaged to the cartridge loading end;
      wherein a biasing force is created by the resilient material diaphragm when the diaphragm body elastically deflects in response to the valve member sliding from the valve closed position to the valve open position, the biasing force decreasing a valve closing time by subsequently assisting sliding return of the valve member to the valve closed position.

22. The pressure balanced valve assembly of claim 21, wherein the valve member includes a raised seat engagement portion having oppositely directed first and second engagement surfaces, the first engagement surface of the valve member contacting a first seat ring of the first cartridge divider in a valve closed position.

23. The pressure balanced valve assembly of claim 22, further comprising:
   a second cartridge divider separating the outlet port from an exhaust port;
   wherein in the valve closed position the inlet port is isolated from the outlet port and the outlet and exhaust ports are in fluid communication with each other.

24. The pressure balanced valve assembly of claim 21, further comprising:
   a piston end of the valve member; and
   a cylinder cavity of the retaining member; the piston end being non-sealingly and slidably received in the cylinder cavity of the retaining member to assist in aligning the valve member on the longitudinal axis of the valve body.

25. The pressure balanced valve assembly of claim 21, wherein the valve member includes first and second spool rings each having a diameter equal to a fluid exposed diameter of the diaphragm body, creating a pressure balanced condition of the valve assembly in each of a valve open and a valve closed position.

26. The pressure balanced valve assembly of claim 21, wherein the diaphragm body is planar in a direction transverse to the longitudinal axis to provide even loading as the diaphragm body deflects in response to sliding movement of the valve member.

27. A diaphragm sealed, pressure balanced valve assembly, comprising:
- a valve body; and
- a cartridge connected to the valve body, the cartridge including:
  - a first cartridge divider separating an inlet port from an outlet port;
  - a cartridge loading end;
  - a retaining member axially adjustably engaged to the cartridge loading end;
  - a valve member sliding coaxially to a longitudinal axis of the valve body between a valve open position and a valve closed position, the valve member partially slidably received in the retaining member;
  - a piston end of the valve member slidably and non-sealingly received in a cylinder cavity of the retaining member; and
  - a resilient material diaphragm overmolded to the valve member having a diaphragm body clasped between the retaining member and the cartridge loading end to create a fluid pressure boundary;
  - wherein a biasing force is created by the resilient material diaphragm when the diaphragm body elastically deflects in response to the valve member sliding from the valve closed position to the valve open position, the biasing force subsequently assisting sliding return of the valve member to decrease a valve closing time.

28. The pressure balanced valve assembly of claim 27, wherein the valve member further comprises an armature portion oppositely oriented with respect to the piston end.

29. The pressure balanced valve assembly of claim 28, wherein the valve body includes:
- a solenoid can;
- a coil bobbin received in the solenoid can; and
- a coil retained by the coil bobbin;
- wherein the armature portion of the valve member is slidably moved coaxially to the longitudinal axis of the valve body to the valve open position when the coil is energized.

30. The pressure balanced valve assembly of claim 29, further comprising:
- a pole piece axially positioned within in the coil bobbin; and
- a biasing member in contact with the pole piece and the armature portion of the valve member adapted to bias the valve member toward the valve closed position.

31. The pressure balanced valve assembly of claim 27, further comprising:
- a second cartridge divider separating the outlet port from an exhaust port;
- wherein in a valve closed position the inlet port is isolated from the outlet port and the outlet and exhaust ports are in fluid communication with each other; and
- wherein in a valve open position the inlet port is in fluid communication with the outlet port and the inlet and outlet ports are both isolated from the exhaust port.

32. The pressure balanced valve assembly of claim 27, wherein the diaphragm body extends between the valve member and the retaining member in a direction that is transverse to the longitudinal axis to provide even loading of the resilient material diaphragm as the diaphragm body deflects in response to movement of the valve member.

33. A diaphragm sealed, pressure balanced valve assembly, comprising:
- a valve body; and
- a cartridge connected to the valve body, the cartridge including:
  - a cartridge loading end;
  - a retaining member engaged to the cartridge loading end;
  - a valve member sliding coaxial to a longitudinal axis of the valve body between a valve open position and a valve closed position; and
  - a resilient material diaphragm connected to and extending diametrically outward from the valve member having a diaphragm body clasped between the retaining member and the cartridge loading end creating a fluid pressure boundary;
  - wherein the diaphragm body is substantially planar in a direction transverse to the longitudinal axis to provide even loading as the diaphragm body deflects in response to movement of the valve member; and
  - wherein a biasing force is created by the resilient material diaphragm when the diaphragm body elastically deflects in response to the valve member sliding from the valve closed position to the valve open position, the biasing force subsequently assisting sliding return of the valve member to decrease a valve closing time.

* * * * *